US005709115A

United States Patent [19]
Richter

[11] Patent Number: 5,709,115
[45] Date of Patent: Jan. 20, 1998

[54] SIDEBAR IGNITION LOCK

[75] Inventor: Carl E. Richter, Menomonee Falls, Wis.

[73] Assignee: Strattec Security Corp., Milwaukee, Wis.

[21] Appl. No.: 383,459

[22] Filed: Feb. 3, 1995

[51] Int. Cl.$^6$ .............. C05B 27/00
[52] U.S. Cl. .............. 70/495; 70/417; 70/419
[58] Field of Search .............. 70/495, 386, 454, 70/375, 416, 417, 419

[56] References Cited

U.S. PATENT DOCUMENTS

| | | | |
|---|---|---|---|
| 2,126,391 | 8/1938 | Jacobi | 70/417 |
| 2,225,703 | 12/1940 | Machinist | 70/417 |
| 2,942,452 | 6/1960 | Marchese | 70/454 |
| 3,665,740 | 5/1972 | Taniyama | 70/375 X |
| 5,001,914 | 3/1991 | Edwards | 70/419 X |
| 5,050,412 | 9/1991 | Errani | 70/419 X |
| 5,109,686 | 5/1992 | Toussant | 70/454 |
| 5,295,376 | 3/1994 | Myers | 70/386 X |
| 5,375,444 | 12/1994 | Smith | 70/495 |
| 5,475,998 | 12/1995 | Raskevicius et al. | 70/495 |
| 5,477,713 | 12/1995 | Lay | 5/454 |

*Primary Examiner*—Rodney M. Lindsey
*Assistant Examiner*—Monica E. Millner
*Attorney, Agent, or Firm*—Andrus, Sceales, Starke & Sawall

[57] ABSTRACT

A sidebar ignition lock is provided with improved anti-tampering features. The ignition lock includes a cylinder extending along a longitudinal axis and rotatably supported within a sleeve. The tumblers are maintained entirely within the diameter of the cylinder to prevent possible picking of the lock. A knob is provided to prevent access to the area between the outer surface of the cylinder and the inner surface of the sleeve. When the cylinder is received within the sleeve, the knob is maintained on the cylinder head by a retaining member extending from the sleeve. The sidebar ignition lock further includes a roller ball detent to prevent over rotation of the cylinder with respect to the sleeve.

12 Claims, 3 Drawing Sheets

SIDEBAR IGNITION LOCK

BACKGROUND OF THE INVENTION

This invention relates to a mechanical lock, and in particular, to a sidebar ignition lock for a motor vehicle.

A mechanical key lock includes a cylinder rotatably supported within a sleeve. When the mated key is inserted in the cylinder, the key and the cylinder may be rotated within the sleeve.

In order to prevent rotation of the cylinder without a mated key, a sidebar is utilized. The sidebar is placed within a slot in the cylinder and aligned with a groove in the sleeve. The sidebar is biased away from the sleeve toward the interior of the cylinder by a spring. When the mated key is not present in the cylinder, tumblers, supported within the cylinder, maintain a portion of the sidebar within the groove in the sleeve. This, in turn, prevents the cylinder from being rotated relative to the sleeve.

Each tumbler includes a notched portion such that when the mated key is inserted in the cylinder, the notch in each tumbler is aligned with the sidebar. As a result, the biased sidebar is urged toward the notches in the tumblers by action of the springs. If the tumblers have been properly set by the mated key, the sidebar will enter the notches in the tumblers, and exit the groove in the sleeve. As a result, the cylinder is free to be rotated within the sleeve.

In an ignition lock, when a mated key inserted in the cylinder, the cylinder is free to rotate within the sleeve from a locked position to an unlocked or fully rotated position. A stop may be provided to prevent over rotation of the cylinder within the sleeve. Over rotation of the cylinder may result in damage to the column or other components of the motor vehicle.

Further, over the last several years, it is become increasingly desirable to improve the anti-tampering features of lock and key sets. This is particularly true with respect to automobile ignition systems where auto theft has almost developed into an art form. Typically, the key and cylinder lock for engaging and energizing the ignition system is either bypassed or pulled out from the sleeve in order to facilitate theft.

Therefore, it is a primary object and feature of the present invention to provide a sidebar ignition lock for a motor vehicle which incorporates features to prevent theft of the motor vehicle.

It is a further object and feature of the present to provide a sidebar ignition lock wherein the cylinder is prevented from over rotating in the sleeve.

SUMMARY OF THE PRESENT INVENTION

In accordance with the present invention, a sidebar ignition lock is provided. The ignition lock includes a cylinder rotatably receivable within a sleeve. The cylinder defines an external cylinder surface, a longitudinal axis and a key way disposed along the axis for slidably receiving a key therein. The cylinder further includes a sidebar slot extending radially with respect to the axis, a detent slot extending radially with respect to the axis, and a tumbler ward extending radially from the axis at a location angularly spaced from the sidebar slot. The sidebar slot has an opened inner end which opens into the tumbler ward, and an opened outer end which opens to the external cylindrical surface.

A sidebar is slidably mounted within the sidebar slot for radial movement therein. The sidebar includes a tongue at its inner end and a radially outer end. The sidebar is movable between a first cylinder locking position wherein the outer end of the sidebar projects from the cylinder, and the second cylinder unlocking position wherein the outer end of the sidebar is retracted within the cylinder. Means are provided for biasing the sidebar radially inward toward the unlocking position.

A tumbler is disposed in the tumbler ward for sliding movement radially with respect to the axis between a non-aligned position with the sidebar whereby the tumbler holds the sidebar in its cylinder locking position, and an aligned position with the sidebar whereby the sidebar is permitted to move to its cylinder unlocking position. The entire tumbler is retracted within the tumbler ward in the cylinder when the tumbler in its non-aligned position and when the tumbler is in its aligned position.

A roller ball detent is rotatably mounted within the detent slot for radial movement therein. The roller ball detent is movable between a first position wherein in a portion of the roller ball detent projects from the outer surface of the cylinder, and a second position wherein the roller ball detent is retracted within the detent slot.

A knob is provided having a plurality of tangs projecting therefrom. The tangs define a cylinder head receipt cavity for receiving a portion of the cylinder therein. The tangs are movable between a first locking position wherein a portion of the cylinder may not be removed from the cavity, and a second unlocking position wherein the portion of the cylinder may be removed from the cavity.

Finally, a retaining member is provided. The retaining member extends from the sleeve and maintains the tangs in the locking position when the cylinder is received within the sleeve.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

BRIEF DESCRIPTION OF THE PREFERRED EMBODIMENT

Figure 1:
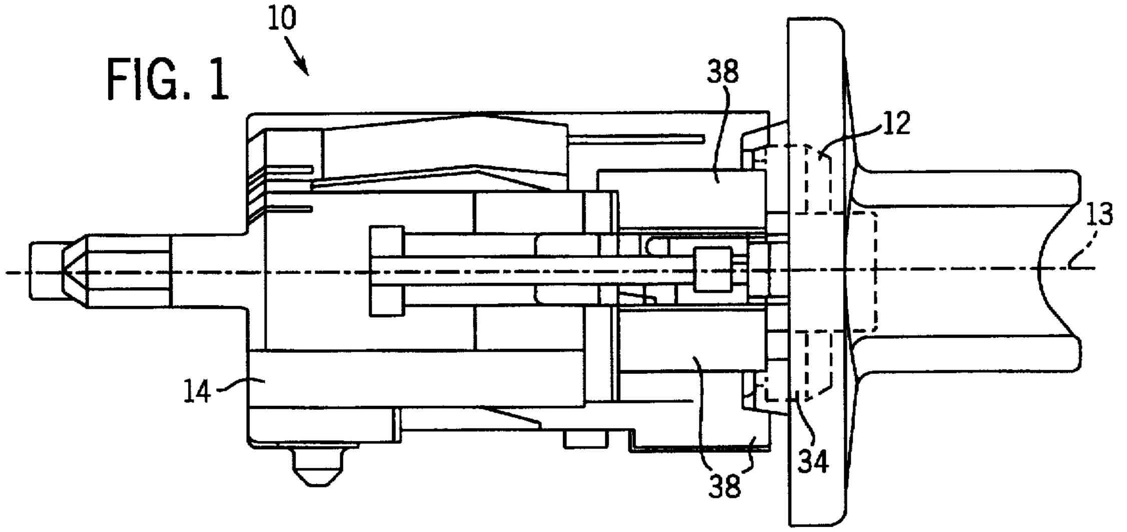
FIG. 1 is a side elevational view of a sidebar ignition lock in accordance with the present invention.

Referring to FIG. 1, the sidebar ignition lock of the present invention is generally designated by the reference numeral 10. The ignition lock 10 includes a cylinder 12 extending along a longitudinal axis 13, and which is rotatably supported within a sleeve 14.

Cylinder 12 is in the form of a cylindrical, substantially hollow housing, which defines a central longitudinal axis 13 about which cylinder 10 is rotated. Cylinder 12 includes a center key way 15 disposed along axis 13 for receiving a key (not shown) in the conventional manner to permit rotation of cylinder 12. As is conventional, key way 15 opens at its front end to the front face of cylinder 12 is blind or closed at the opposite end of cylinder 12.

Cylinder 12 is rotatable in sleeve 14 between a first locked position and a second fully rotated position. A mated key is used in normal circumstances for unlocking the sidebar ignition lock 10 so as to allow cylinder 12 to rotate within sleeve 14. When a mated key is not present in the cylinder 12, cylinder 12 cannot be rotated. However, when a mated key is inserted in the cylinder 12, the key and the cylinder 12 may be rotated from the locked position to the start position so as to start the motor vehicle in the known manner.

Figure 5:
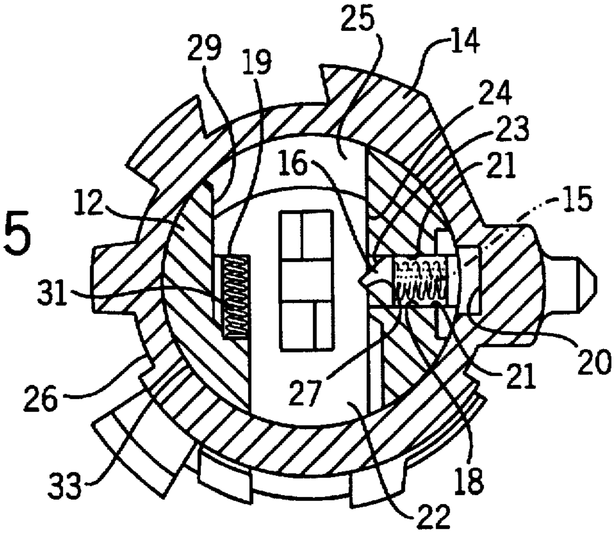
FIG. 5 is a cross-sectional view of the sidebar ignition lock of FIG. 2 taken along line 5—5.

In order to prevent rotation of the cylinder 12 without a mated key, a sidebar 16, FIG. 5, is utilized. The sidebar 16 is placed within a slot 18 in cylinder 12 and aligned with groove 20 in the sleeve 14. The sidebar is biased away from the sleeve 14 toward the interior of the cylinder 12 by a pair of springs 15 (one shown in phantom).

A plurality of tumblers 22 are slidably mounted within a corresponding number of tumblers slots or wards 25 contained within cylinder 12. Each ward 25, and therefore tumblers 22, are oriented transversely in a plane passing perpendicularly through axis 13. Each ward 25 extends 90° with respect to slot 18, and as is conventional, each tumbler is slidably mounted to engage sidebar 16. As best shown in FIG. 5, a ward or slot 25 is defined by opposing walls 27 and 29 in cylinder 12 which guide tumbler 22 and its sliding movement.

When a mated key is not present in the cylinder 12, tumbler engaging surface 23 on the tongue of sidebar 16 engages the outer surface 24 of tumbler 22 such that a portion of sidebar 16 is positioned within groove 20 and sleeve 14. Hence, sidebar 16 will engage the sidewalls 21 of groove 20 if a user attempts to rotate cylinder 12 without a mated key.

Each tumbler 22 also includes a corresponding spring 31 extending between a seat 33 formed in the interior side portion of cylinder 12 in wall 29 and a boss 19 projecting from tumbler 22. Thus, spring 31 urges tumbler 22 in a radial direction from axis 13 and thus, biases tumbler 22. It is important to note that the normal spring force of springs 31 acting on tumbler 22 is greater than the normal spring force of the sidebar springs acting on sidebar 16. This permits tumblers 22 to slide with respect to sidebar 16 even though the tumbler engaging surface 23 of sidebar 16 engages notch 27 of tumblers 22.

As best seen in FIG. 5, in accordance with the present invention, each tumbler 22 is maintained entirely within the diameter of cylinder 12. Since no portion of each tumbler 22 extends beyond the outer surface 33 of cylinder 12 when a mated key is not present in the cylinder 12, the lock 10 becomes more difficult to pick. As herein after described, cylinder 12 is allowed to rotate within sleeve 14 when notches 27 in each tumbler 22 are in alignment. It has been found that if tumbler 22 extends beyond the outer surface 26 of cylinder 12, it is easier for the thief to insert a tool between cylinder 12 and sleeve 14 so as to align the tumblers and unlock lock 10 without a mated key.

As previously described, each tumbler 22 includes a notch 27 where the tumbler diameter is reduced. When the mated key is inserted into cylinder 12, the notches 27 in each tumbler 22 aligned with tumbler engaging surface 23 of sidebar 16. As previously described, sidebar 16 is urged toward the interior of cylinder 12 such that when a mated key is inserted in cylinder 12, a portion of tumbler engaging surface 23 will enter notches 27. Consequently, sidebar 16 will exit groove 20 so as to allow cylinder 12 to rotate freely with respect to sleeve 14.

Figure 2:
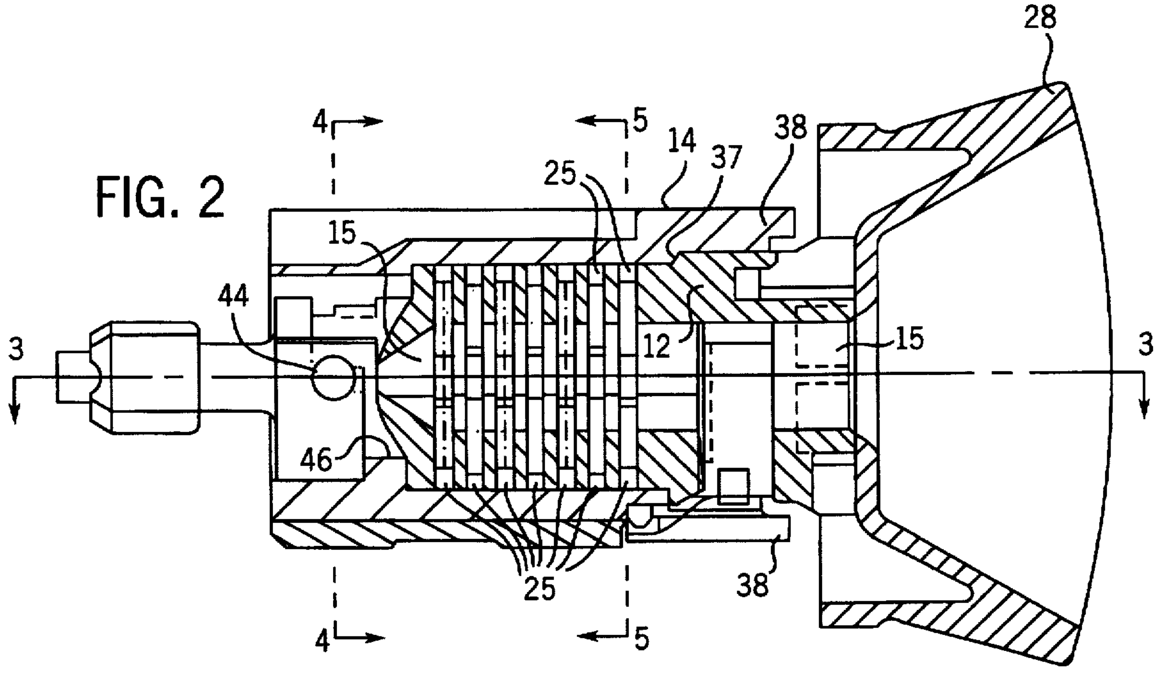
FIG. 2 is a cross-sectional view of the sidebar ignition lock of FIG. 1 rotated 180°.
Figure 3:
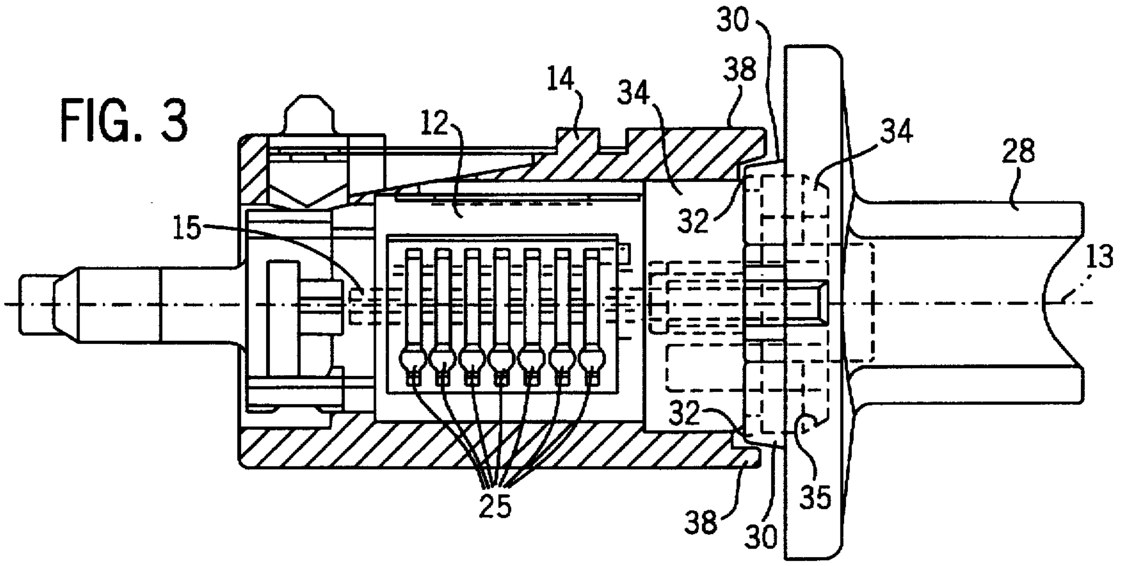
FIG. 3 is a cross-sectional view of the sidebar ignition lock of FIG. 2 taken along line 3—3.
Figure 6:
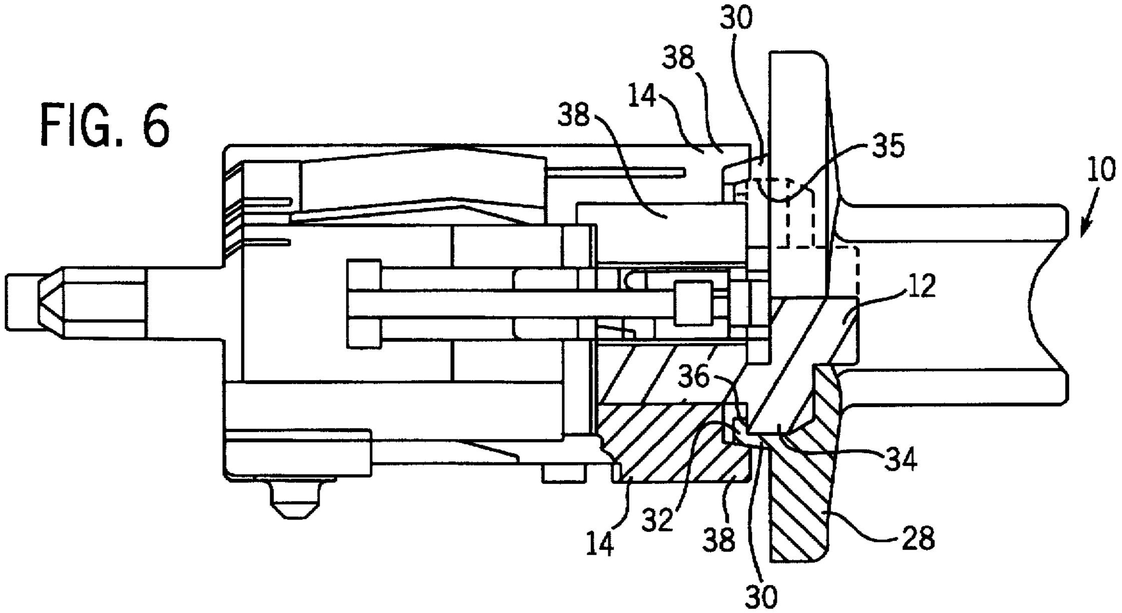
FIG. 6 is a side elevational view of a sidebar ignition lock of FIG. 1 with portions broken away.

Referring to FIGS. 2–3, and 6, in order to further deter theft of the motor vehicle, sidebar ignition lock 10 incorporates an anti-tampering knob 28. Knob 28 includes a plurality of resilient tangs 30 which extend from knob 28 toward sleeve 14 when mechanical lock 10 is assembled. Each tang 30 includes a rib portion 32 directed toward longitudinal axis 13.

Knob 28 is mounted to cylinder 12 by press-fitting knob 30 over cylinder head 34 such that tangs 30 are urged radially outward. Cylinder head 34 is positioned in cavity 35 defined by tangs 30 such that ribs 32 fit over shoulder 36 of cylinder head 34. As resilient tangs 30 return to their original position, cylinder head 34 is prevented from being removed from knob 28 without urging tangs 30 radially outward again.

In order to defeat a motor vehicle lock, automobile thieves are known to grab the head of the cylinder 12 of the lock and forcibly rotate the cylinder to its start position so as to actuate the ignition switch. As a prerequisite to grabbing cylinder head 34, the automobile thief must remove knob 28. To combat a thief, sleeve 14 includes a plurality of retaining members 38 which act to prevent the urging of tangs 30 radially outward when cylinder 12 is rotatably supported in sleeve 14. The retaining members 38 prevent the outward radial movement of tangs 30 such that rib portion 32 cannot pass over the diameter of cylinder head 34. As a result, knob 28 cannot be removed from ignition lock 10 without breaking knob 28 into pieces. The delay in requiring the automobile thief to break off knob 28 from cylinder 12 increases the amount of time it takes to steal the motor vehicle. In many cases, this delay may be sufficient to foil a theft attempt.

Further, in order to defeat a motor vehicle ignition lock, automobile thieves are known to attempt to manipulate each tumbler 22 in cylinder 12 so as to align notches 27 with tumbler engaging surface 23 of sidebar 16. As previously described, when notches 27 are aligned, sidebar 16 may exit groove 20 so as to allow cylinder 12 to rotate freely with respect to sleeve 14. Knob 28 in conjunction with step 37, FIG. 2, along inner surface 46 of sleeve 14 prevent the automobile thief from gaining access to the tumblers through the area between the cylinder 12 and sleeve 14 by blocking access to the area. As previously explained, knob 28 cannot be removed from cylinder head 34 without breaking knob 28. As previously described, the delay caused by requiring the automobile thief to break off knob 28 from cylinder 12 and manipulate a tool past step 37 in sleeve 14 may be sufficient to foil a theft attempt.

In order to prevent rotation of cylinder 12 beyond the fully rotated position, a detent mechanism is provided in cylinder 12 by forming a radially extending slot or bore 40 for receiving a spring 42 and a ball 44. Spring 42 urges ball 44 toward the interior surface 46 of sleeve 14. The interior surface 46 of sleeve 14 is provided with a groove 48. Groove 48 includes a first end 50 having a notch 52 therein, and a second end 54 also having a notch 56 therein.

Figure 4A:
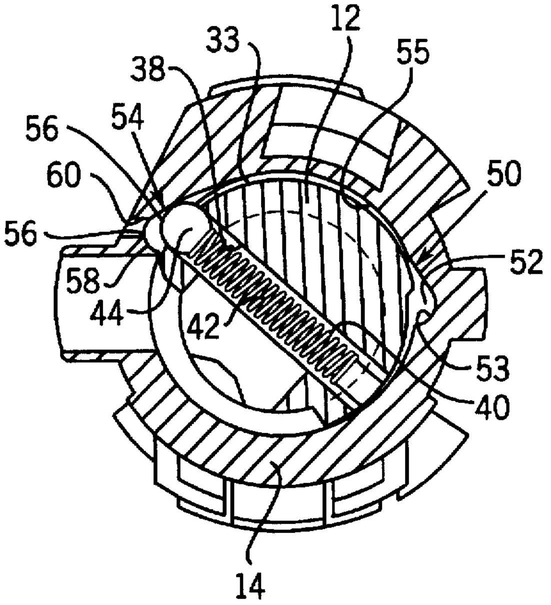
FIG. 4*a* is a cross-sectional view of the sidebar ignition lock of FIG. 2 taken along line 4—4 showing the cylinder of the lock in the fully rotated position.
Figure 4B:
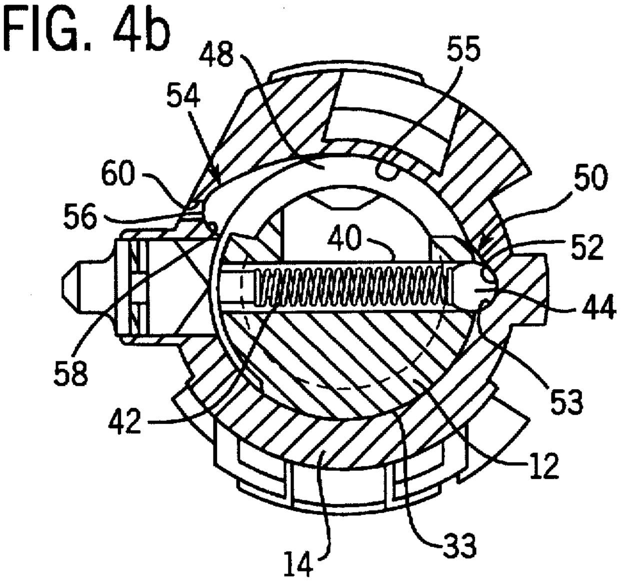
FIG. 4*b* is a cross-sectional view of the sidebar ignition lock of FIG. 2 taken along line 4—4 showing the cylinder of the lock in the "locked" position.

Referring to FIG. 4*b*, notch 52 corresponds to the locked position of cylinder 12. When cylinder 12 is rotated to the locked position, a portion of ball 44 is received within notch 52 in groove 48. Notch 52 gives the user notice, by feel, of when the ignition lock 10 is in the locked position. In addition, ball 44 in notch 52 prevents undesired counterclockwise rotation of cylinder 12 from the locked position to the accessory position, as is conventional. If the user attempts to rotate cylinder 12 counterclockwise from the locked position, the portion of ball 44 in notch 52 will engage contact 53 of notch 52 thereby hindering, but not preventing, further rotation of cylinder 12.

Referring to FIG. 4*a*, when a user inserts a mated key in the cylinder and turns the cylinder 12 and key clockwise, ball 44 rotates along sidewall 55 of groove 48 until cylinder 12 reaches the fully rotated position for the ignition switch. The fully rotated position for the ignition lock 10 corresponds to notch 56 on the second end 54 of groove 48. When a portion of ball 44 enters into notch 56, cylinder 12 may no longer be rotated clockwise because any attempt to turn cylinder 12 clockwise results in the portion of ball 44 in notch 56 abutting against shoulder 58 along the inner surface 46 of sleeve 14. This prevents the user from over rotating the cylinder 12 which may, as previously described, cause damage to the motor vehicle.

In order to remove cylinder 12 from sleeve 14, the mated key and cylinder 12 must be rotated from the locked position to the fully rotated position such that a portion of ball 44 is partially received within notch 56 in sleeve 14. An aperture 60 is provided in the side wall of sleeve 14 so as to allow access to the interior of sleeve 14. In order to remove cylinder 12 from sleeve 14, a user may insert a tool such as a pin or the like into aperture 60 so as to urge ball 44 against the compression of spring 42 into bore 40 such that no portion of ball 44 extends into notch 56 in sleeve 14. Ball 44 will no longer abut notch 56 in sleeve 14 when the user attempts to slide cylinder 12 longitudinally out of the sleeve 14.

Various modes of carrying out the invention are contemplated as being within the scope of the following claims, particularly pointing out and distinctly claiming the subject matter which is regarded as the invention.

I claim:

1. A sidebar ignition lock, comprising:

a sleeve having first and second ends, and an inner peripheral surface defining an inner core, a cylinder with an enlarged head rotatably receivable within the core of the sleeve, the cylinder defining an external cylinder surface, a longitudinal axis and a keyway disposed along the axis for slidably receiving a key therein, the cylinder further including a sidebar slot extending radially with respect to the axis, a detent slot extending radially with respect to the axis, and a tumbler ward extending radially from the axis at a location angularly spaced from the sidebar slot, the sidebar slot having an opened inner end which opens into the tumbler ward and an opened outer end which opens to the external cylinder surface;

a sidebar slidably mounted within the sidebar slot for radial movement therein, the sidebar includes a tongue at its inner end and a radially outer end, and is movable between a first cylinder locking position wherein the outer end of the sidebar projects from the cylinder, and a second cylinder unlocking position wherein the outer end of the sidebar is retracted within the cylinder;

means for biasing the sidebar radially inward toward the unlocking position;

a knob having a plurality of circumferentially spaced tangs projecting therefrom, the tangs defining a cylinder head receipt cavity for receiving the cylinder head therein, the tangs movable between a first locking position wherein the cylinder head is retained within the cylinder head receipt cavity, and a second unlocking position wherein the cylinder head may be removed from the cylinder head receipt cavity; and a plurality of circumferentially spaced tabs integral with and projecting longitudinally from the first end of the sleeve so as to maintain the tangs in the first locking position when the cylinder is received within the inner core of the sleeve.

2. The sidebar ignition lock of claim 1 further comprising a roller ball detent rotatably mounted within a detent slot for radial movement therein, a roller ball detent movable between a first position wherein a portion of the roller ball detent projects from the cylinder, and a second position wherein the roller ball detent is retracted within the detent slot.

3. The sidebar ignition lock of claim 1 further comprising a tumbler slidably received in the tumbler ward for radial movement therein, the tumbler slidable between a non-aligned position with the sidebar whereby the tumbler holds the sidebar in its cylinder locking position, and an aligned position with the sidebar whereby the sidebar is permitted to move to its cylinder unlocking position, the entire tumbler completely maintained within the tumbler ward of the cylinder.

4. The sidebar ignition lock of claim 1 wherein the cylinder includes first and second portions, the first and second portions interconnected by a shoulder formed therebetween in the external cylinder surface of the cylinder.

5. The sidebar ignition lock of claim 4 wherein the sleeve includes an internal sleeve surface having a shoulder corresponding to the shoulder formed in the external cylinder surface of the cylinder.

6. The sidebar ignition lock of claim 1 wherein the external cylinder surface of the cylinder includes a first external cylinder surface portion and a second external cylinder surface portion, wherein the first external cylinder surface portion and the second external surface portion are not coplaner.

7. A cylinder lock having a mated key, comprising:

a generally cylindrical sleeve having first and second ends, and an inner surface defining a cavity therein;

a cylinder rotatably receivable within the cavity of the sleeve, the cylinder defining an external cylinder surface, a longitudinal axis and a keyway disposed along the axis for slidably receiving the key therein;

a cylinder head projecting from a first end of the cylinder;

a knob having a plurality of circumferentially spaced tangs projecting therefrom, the tangs defining a cylinder head receipt cavity for receiving the cylinder head therein, the tangs movable between the first locking position wherein the cylinder head is retained within the cylinder head receipt cavity, and a second unlocking position wherein the cylinder head may be removed from the cylinder head receipt cavity; and a plurality of circumferentially spaced tabs integral with and projecting longitudinally from the first end of the sleeve such that the tabs maintain the tangs of the knob in the first locking position when the cylinder is received within the cavity in the sleeve.

8. The cylinder lock of claim 7 wherein the cylinder includes a tumbler ward extending radially with respect to the axis.

9. The cylinder lock of claim 7 further comprising a key controlled tumbler supported within the tumbler ward of the cylinder and movable between a locked and an unlocked position.

10. The cylinder lock of claim 7 wherein the cylinder includes first and second portions, the first and second portions are interconnected by a shoulder formed therebetween in the external cylinder surface of the cylinder.

11. The cylinder lock of claim 10 wherein the intersurface of the sleeve includes a shoulder corresponding to the shoulder formed in an external cylinder surface of the cylinder.

12. The cylinder lock of claim 7 wherein the external cylinder surface of the cylinder includes a first external cylinder surface portion and a second external cylinder surface portion, wherein the first external cylinder surface portion and a second external surface portion are not coplaner.

* * * * *